United States Patent
Kawai et al.

(10) Patent No.: US 10,767,752 B2
(45) Date of Patent: Sep. 8, 2020

(54) TRANSFER DEVICE AND POWER TRANSMISSION DEVICE

(71) Applicant: HONDA MOTOR CO., LTD., Tokyo (JP)

(72) Inventors: Shinji Kawai, Saitama (JP); Mitsuru Manita, Saitama (JP); Shoichi Takimoto, Saitama (JP); Taro Kimura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 3 days.

(21) Appl. No.: 16/318,188

(22) PCT Filed: May 9, 2017

(86) PCT No.: PCT/JP2017/017545
§ 371 (c)(1),
(2) Date: Jan. 16, 2019

(87) PCT Pub. No.: WO2018/029923
PCT Pub. Date: Feb. 15, 2018

(65) Prior Publication Data
US 2019/0285166 A1     Sep. 19, 2019

(30) Foreign Application Priority Data

Aug. 10, 2016  (JP) ................................ 2016-158214
Aug. 10, 2016  (JP) ................................ 2016-158215
(Continued)

(51) Int. Cl.
*F16H 57/04*     (2010.01)
*B60K 17/344*    (2006.01)
(Continued)

(52) U.S. Cl.
CPC ....... *F16H 57/0471* (2013.01); *B60K 17/344* (2013.01); *F16H 1/14* (2013.01);
(Continued)

(58) Field of Classification Search
CPC .. F16H 57/0471; F16H 57/021; F16H 57/029; F16H 57/038; F16H 57/0424; F16H 57/0457; F16H 57/0495; B60K 17/344
See application file for complete search history.

(56) References Cited

U.S. PATENT DOCUMENTS 1,631,217 A  *  6/1927  Matthews ............... B60R 17/00
                                                      184/13.1
3,318,173 A  *  5/1967  Puidokas .............. F16C 19/548
                                                      475/160
(Continued)

FOREIGN PATENT DOCUMENTS

JP     53-61580 U1     5/1978
JP     54-95730 U      7/1979
(Continued)

OTHER PUBLICATIONS

Office Action dated Jul. 30, 2019, issued in counterpart JP Application No. 2016-158214 (3 pages).
(Continued)

*Primary Examiner* — David M Fendstermacher
(74) *Attorney, Agent, or Firm* — Westerman, Hattori, Daniels & Adrian, LLP

(57) ABSTRACT

Provided is a device that includes a transfer input gear meshing with a final driven gear, a transfer input shaft pivotally supporting the transfer input gear, a first bevel gear provided on the transfer input shaft, a second bevel gear meshing with the first bevel gear, a transfer output shaft pivotally supporting the second bevel gear, a transfer case covering at least the first bevel gear and the second bevel
(Continued)

gear, and a guide section guiding at least part of scooped fluid that is scooped up by the final driven gear into the transfer case.

15 Claims, 14 Drawing Sheets

(30) Foreign Application Priority Data

Aug. 10, 2016 (JP) .................................. 2016-158216
Aug. 10, 2016 (JP) .................................. 2016-158217

(51) Int. Cl.
*F16H 1/14* (2006.01)
*F16H 57/021* (2012.01)
*F16H 57/029* (2012.01)
*F16H 57/038* (2012.01)

(52) U.S. Cl.
CPC ......... *F16H 57/021* (2013.01); *F16H 57/029* (2013.01); *F16H 57/038* (2013.01); *F16H 57/04* (2013.01); *F16H 57/0424* (2013.01); *F16H 57/0457* (2013.01); *F16H 57/0495* (2013.01)

(56) References Cited

U.S. PATENT DOCUMENTS

| | | | | |
|---|---|---|---|---|
| 3,529,698 | A * | 9/1970 | Nelson | B61C 17/08 |
| | | | | 184/6.12 |
| 8,657,073 | B2 * | 2/2014 | Matsumoto | F16H 57/0483 |
| | | | | 184/11.1 |
| 9,546,727 | B2 * | 1/2017 | Kruger | F16H 57/0409 |
| 9,903,464 | B2 * | 2/2018 | Mori | F16H 57/0427 |
| 10,385,963 | B2 * | 8/2019 | Torii | F16H 57/0423 |
| 10,550,929 | B2 * | 2/2020 | Ahn | F16N 21/00 |
| 2005/0185873 | A1 * | 8/2005 | Musso | F16C 35/061 |
| | | | | 384/571 |
| 2008/0096715 | A1 * | 4/2008 | Ono | F16H 57/0483 |
| | | | | 475/160 |
| 2012/0096968 | A1 * | 4/2012 | Kawamoto | F16H 57/0409 |
| | | | | 74/467 |
| 2012/0172167 | A1 * | 7/2012 | Myers | F16H 57/0424 |
| | | | | 475/160 |
| 2015/0204436 | A1 * | 7/2015 | Mafune | F16H 57/0409 |
| | | | | 475/160 |
| 2015/0276043 | A1 * | 10/2015 | Girardot | F16H 57/0423 |
| | | | | 475/160 |
| 2016/0153546 | A1 * | 6/2016 | Ogawa | F16H 57/0457 |
| | | | | 475/152 |

FOREIGN PATENT DOCUMENTS

| | | |
|---|---|---|
| JP | 63-266268 A | 11/1988 |
| JP | 64-12965 U | 1/1989 |
| JP | 4-83957 A | 3/1992 |
| JP | 6-10655 U | 2/1994 |
| JP | 10-16582 A | 1/1998 |
| JP | 10-203190 A | 8/1998 |
| JP | 11-51159 A | 2/1999 |
| JP | 2009-41589 A | 2/2009 |
| JP | 2009-138899 A | 6/2009 |
| JP | 2012-87823 A | 5/2012 |
| JP | 2013-108595 A | 6/2013 |
| JP | 2015-168392 A | 9/2015 |
| JP | 2016-37972 A | 3/2016 |

OTHER PUBLICATIONS

Office Action dated Jul. 30, 2019, issued in counterpart JP Application No. 2016-158215 (3 pages).
Office Action dated Jul. 30, 2019, issued in counterpart JP Application No. 2016-158216 (2 pages).
Office Action dated Jul. 30, 2019, issued in counterpart JP Application No. 2016-158217 (3 pages).
International Search Report dated Jul. 18, 2017, issued in counterpart application No. PCT/JP2017/017545 (2 pages).

* cited by examiner

TRANSFER DEVICE AND POWER TRANSMISSION DEVICE

TECHNICAL FIELD

The present invention relates to a transfer device and a power transmission device used in a four-wheel-drive vehicle.

BACKGROUND ART

Traditionally, a transfer device is known which is characterized by including a transfer input gear, a transfer input shaft pivotally supporting the transfer input gear, a first bevel gear provided an a transfer input shaft, a second bevel gear meshing with die first bevel gear, a transfer output shaft pivotally supporting the second bevel gear, and a transfer case covering at least die first and second bevel gears (for example, see Japanese Patent Application Laid-Open No. 2015-168392).

SUMMARY OF INVENTION

Technical Problem

Since a transfer device includes a portion where gears are in meshing engagement, it is necessary to lubricate the transfer device using fluid such as lubricating oil.

An object of the present invention, in view of the above, is to provide a transfer device enabling much more appropriate lubrication than in traditional ones.

Solution to Problem

[1] In order to achieve the above-object, a transfer device of the present invention (e.g., the transfer device 5 according to an embodiment, which applies hereinafter) is characterized by including a transfer input gear (e.g., the transfer input gear 56 of the embodiment, which applies hereinafter) meshing with a final driven gear (e.g., the final driven gear 44 of die embodiment, which applies hereinafter) or another gear rotating integrally with the final driven gear (e.g., the other gear of the embodiment, which applies hereinafter), a transfer input shaft (e.g., the transfer input shaft 55 of the embodiment, which applies hereinafter) pivotally supporting the transfer input gear, a first bevel gear (e.g., the first bevel gear 57 of the embodiment, which applies hereinafter) provided on the transfer input shalt, a second bevel gear (e.g., the second bevel gear 85 of the embodiment, which applies hereinafter) meshing with the first bevel gear, a transfer output shaft (e.g., the transfer output shaft 82 of the embodiment, which applies hereinafter) pivotally supporting the second bevel gear, a transfer case (e.g., the transfer case 62 of the embodiment, which applies hereinafter) covering at least die first bevel gear and the second bevel gear, and a guide section (e.g., the through hole 61h of the embodiment, which applies hereinafter) guiding into the transfer case at least part of the fluid scooped up by the final driven gear (e.g., the lubricating oil of the embodiment, which applies hereinafter).

According to the present invention, since the fluid scooped up by the final driven gear via die guide sea ion can be guided into the transfer case, die transfer device can be lubricated using the fluid scooped up by the final driven gear. Accordingly, in comparison with a case where a dedicated lubricating oil for the transfer device is separately used, the configuration of the transfer device can be simplified and the fluid circulation channel of the power transmission device including the transfer device and the final driven gear can be simplified.

[2] Also, it is preferable that the present invention includes a pair of tapered roller bearings (e.g., the tapered roller bearing 70,71 of the embodiment, which applies hereinafter) pivotally supporting the transfer input shaft in the transfer case, the pair of the tapered roller bearings are arranged such that directions in which the tapered roller bearings taper face each other, and a weir section (e.g., the weir section 69 of the embodiment, which applies hereinafter) is provided on an inner peripheral surface of die transfer case so as to suppress the fluid flowing out of the transfer case into final driven gear side, the weir section being positioned between the pair of the tapered roller bearings.

By virtue of this feature, the fluid in the transfer case can be stopped by the weir section and thereby retained sufficiently, and the transfer device can be appropriately lubricated.

[3] Also, it is preferable in the present invention that a plurality of bearings (e.g., the tapered roller bearing 83,84 of the embodiment, which applies hereinafter) are provided in the transfer case, the bearings pivotally supporting the transfer output shaft, and a suppression plate (e.g., the suppression plate 88 of the embodiment, which applies hereinafter) is provided, the suppression plate suppressing leakage of the fluid between the bearings toward the second bevel gear such that the fluid between the bearings is retained By virtue of this feature, the fluid between the multiple bearings pivotally supporting the transfer output shaft can be appropriately retained by the suppression plate, and the multiple bearings pivotally supporting the transfer output shaft can be appropriately lubricated.

[4] Also, it is preferable in the present invention that a plurality of bearings are provided in the transfer case, the bearings pivotally supporting the transfer output shaft, and an intake port (e.g., the notch 63a of the embodiment, which applies hereinafter) for the fluid is provided where the intake port guides at least part of the fluid scooped up by the first bevel gear and/or the second bevel gear into a space between the bearings of the transfer output shaft.

By virtue of this feature, the fluid taken into die transfer case can be guided to the multiple bearings pivotally supporting the transfer output shaft, and the multiple bearings pivotally supporting the transfer output shaft can be appropriately lubricated.

[5] Also, in the present invention, the transfer input gear can be configured to mesh with the final driven gear above a rotation center of the final driven gear. By virtue of this feature, a space can be provided below the transfer device, which achieves improvement in the degree of freedom of vehicle component layouts.

[6] Also, it is preferable in a power transmission device including the transfer device of the present invention that it includes the final driven gear (e.g., the final drive gear 30 of the embodiment, which applies hereinafter) meshing with a final drive gear, and a case (e.g., the transmission case 61 of the embodiment, which applies hereinafter) rotatably supporting the final driven gear via a bearing (e.g., the bearing 43a of the embodiment, which applies hereinafter), wherein the case includes a bearing lubrication guide section (e.g., the sidewall 61c of the embodiment, which applies hereinafter) positioned above the bearing, the bearing lubrication guide section being configured to receive fluid scooped up by the final driven gear and guide the fluid to the bearing.

By virtue of this feature, the lubricating oil received by the bearing lubrication guide section can be guided to the bearing and die bearing can be lubricated more favorably than in die conventional ones.

[7] Also, it is preferable in the present invention that the case include; a recessed section (e.g., the recessed section 61a of the embodiment, which applies hereinafter) that is recessed toward the transfer device in a direction corresponding to a central axis about which the final driven gear rotates, the recessed section corresponding to a portion where the final driven gear or another gear rotating integrally with the final driven gear meshes with the transfer input gear.

By virtue of this feature, a wide transverse space of the portion where the final driven gear or another gear meshes with the transfer input gear 56 can be provided by the recessed section, and the portion of meshing engagement between the final drive gear and the final driven gear can be appropriately lubricated even when the fluid droplets are guided to the bearing.

[8] Also, it is preferable in the present invention that the case includes a bearing lubrication groove (e.g., the bearing lubrication groove 61b of the embodiment, which applies hereinafter) extending from die recessed section toward the bearing lubrication guide section.

By virtue of this feature, part of the fluid droplets entering the recessed section can be further sufficiently guided to the bearing lubrication guide section via the bearing lubrication groove.

[9] Also, it is preferable in the present invention that the device includes the final driven gear meshing with a final drive gear and a case rotatably supporting the final driven gear via a bearing, where the case includes a recessed section (e.g., the recessed section 61a of the embodiment, which applies hereinafter) that is recessed toward the transfer device in a direction corresponding to the central axis about which the final driven gear rotates, the recessed section corresponding to a portion where the final driven gear or another gear rotating integrally with the final driven gear meshes with the transfer input gear.

By virtue of this feature, since the case includes the recessed section that corresponds to the portion where the final driven gear or the other gear meshes with the transfer input gear, at least part of the lubricating fluid scooped up by the final driven gear bypasses the portion where the final driven gear or the other gear meshes with the transfer input gear to enter the recessed section, and then passes through the recessed section and can reach the portion where the final drive gear meshes with the final driven gear. Accordingly, it is made possible to avoid increase in die size of the case and appropriately lubricate the portion where the final drive gear, the final driven gear or the other gear, and the transfer input gear are in meshing engagement with each other.

[10] Also, it is preferable in the present invention that a power transmission device includes the final driven gear meshing with the final drive gear and the case rotatably supporting the final driven gear via the bearing, and includes a receiving section (e.g., the one side section of the delivery rib 61d (the right side portion in the figure) of the embodiment, which applies hereinafter) receiving scooped fluid that is scooped up by the final driven gear above one side in a direction corresponding to the central axis about which the final driven gear rotates, and a bridge section (e.g., the central portion of the delivery rib 61d (the central portion in the figure) of the embodiment, which applies hereinafter) guiding the received fluid to another side in die direction corresponding to the central axis about which the final driven gear rotates, wherein the fluid is guided to the bearing positioned on the other side in the direction corresponding to the central axis about which the final driven gear rotates.

By virtue of this feature, at least part of the lubricating fluid droplets passing the one side in the direction corresponding to the central axis about which the final driven gear rotates can be received by the receiving section and guided toward the other side via the bridge section. By virtue of this, the dead space of the vehicle body existing in the one side in the direction corresponding to the central axis about which the final driven gear rotates can be effectively used to delimit the size of the case on the other side, and improvement of the degree of freedom of arrangement in the vehicle body can be achieved.

[11] Also, it is preferable that the present invention includes another-side guide section (e.g., the guide projection 61f of the embodiment, which applies hereinafter) configured to guide the fluid guided to the other side via the bridge section to the bearing. By virtue of this feature, the fluid guided via the bridge section can be guided to the other bearing by the other-side guide section.

[12] Also, in the present invention, the one side may be defined as the transfer device side. By virtue of this feature, the dead space on the side where the transfer device is provided (the one side) can be effectively used to achieve improvement in the degree of freedom of arrangement in the vehicle body, and the bearing on the other side can be appropriately lubricated by the bridge section.

[13] Also, it is preferable in the present invention that the case includes a recessed section (e.g., the recessed section 61a of the embodiment, which applies hereinafter) that is recessed toward the transfer device in a direction corresponding to the central axis about which the final driven gear rotates, the recessed section corresponding to a portion where the final driven gear or another gear rotating integrally with the final driven gear meshes wife the transfer input gear.

Since the portion where the final driven gear or the other gear meshes wife the transfer input gear receives part of the lubricating fluid scooped up by the final driven gear, this state will cause reduction in the amount of the fluid droplets reaching the bridge section. However, according to the features of the present invention, since the portion where the final driven gear or the other gear meshes with the transfer input gear can be bypassed by the recessed section, more fluid droplets are allowed to reach the bridge section.

[14] Also, it is preferable in fee present invention that a claw section (e.g., the claw section 61e of the embodiment, which applies hereinafter) bent so as to inhibit dropping of the fluid is provided at a lower end of the bridge section. By virtue of this feature, the fluid attached to the bridge section can be prevented by the claw section from dropping before reaching the other bearing, and the other bearing can be further appropriately lubricated.

DESCRIPTION OF EMBODIMENTS

Embodiments of the present invention will be described hereinbelow with reference to the drawings.

Figure 1:
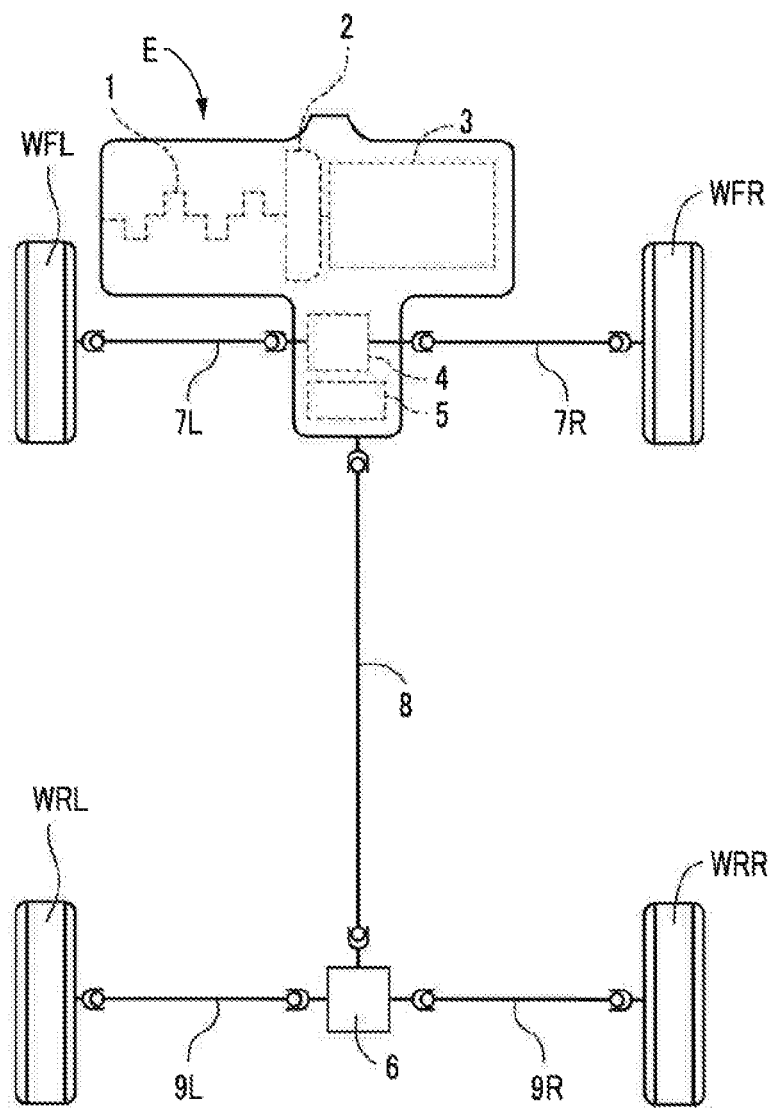
FIG. 1 is a schematic diagram of a power transmission system of four-wheel-drive vehicle.

As illustrated in FIG. 1, an engine E (internal combustion engine, driving source) is transversely mounted in a vehicle body such that its crankshaft 1 is oriented in a left-right direction defined with reference to the vehicle body. A power transmission device PT that transmits the driving force of the engine E to left and right front wheels WFL, WFR and left and right rear wheels WRL, WRR includes a torque converter 2 connected to the crankshaft 1, a transmission 3 connected to the torque converter 2, a front differential gear 4 connected to the transmission 3, a transfer device 5 connected to the front differential gear 4, and a rear differential gear 6 connected to the transfer device 5.

The front differential gear 4 is connected to the left and right front wheels WFL, WFR via a front left axle shaft 7L and a front right axle shaft 7R, respectively. The rear differential gear 6 is connected to the transfer device 5 via a propeller shaft 8 and connected to the left and right rear wheels WRL, WRR via a rear left axle shaft 9L and a rear right axle shaft 9R, respectively.

Figure 2:
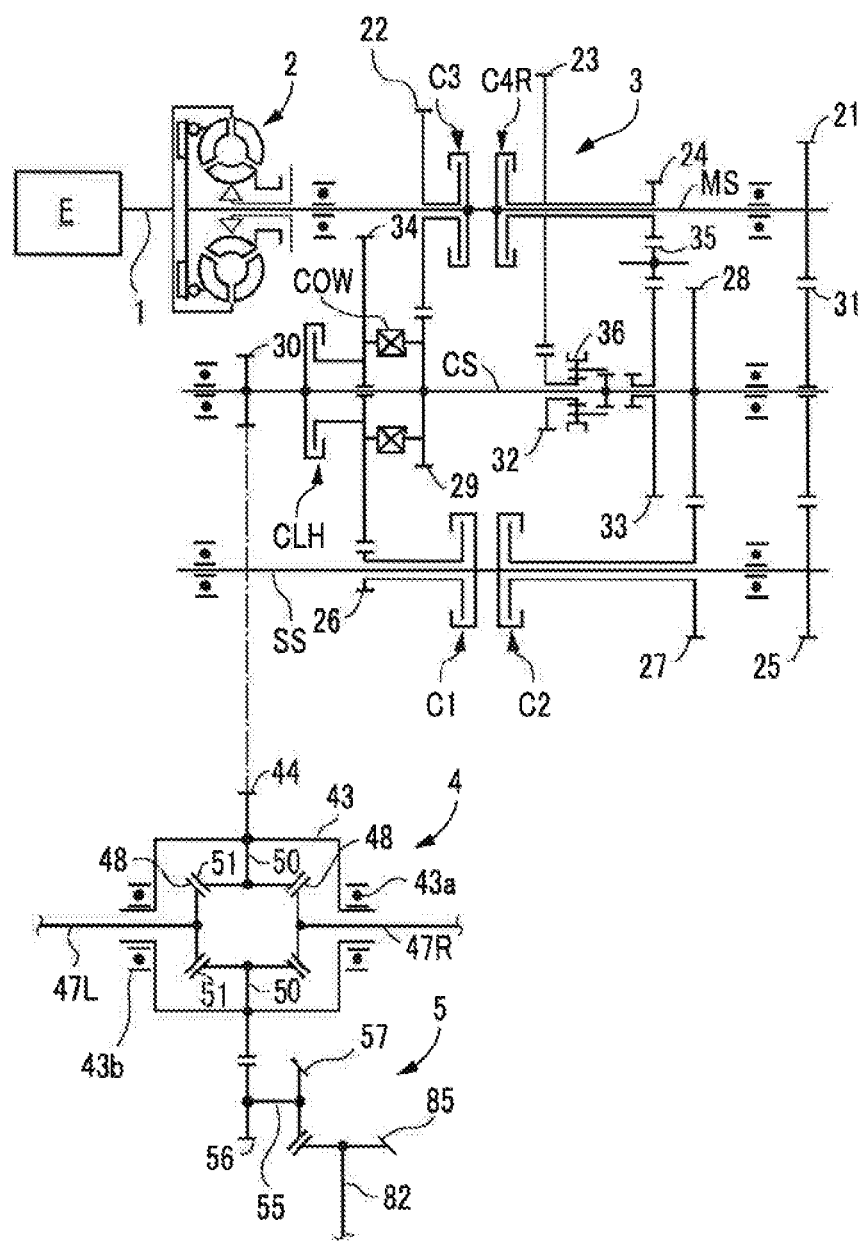
FIG. 2 is a skeleton diagram of a power transmission device.

Next, as illustrated in FIG. 2, the transmission 3 includes a main shaft MS, a secondary shaft SS, and a counter shaft CS which are arranged in a parallel with each other and extend in the left-right direction defined with reference to the vehicle body.

A main drive gear 21 is mounted and fixed to the main shaft MS. In addition, a main third-speed gear 22 operable to be coupled to the main shaft MS by a third-speed clutch C3, a main fourth-speed gear 23 formed integrally and operable to be coupled to the main shaft MS by a fourth-speed-reverse clutch C4R, and a main reverse gear 24 are rotatably supported by the main shaft MS, where the main fourth-speed gear 23 and the main reverse gear 24 are formed integrally with each other.

A secondary driven gear 25 is fixed and mounted to the secondary shaft SS. In addition, a secondary first-speed gear 26 operable to be coupled to the secondary shaft SS by the first-speed clutch C1, and a secondary second gear 27 operable to be coupled to the secondary shaft SS by a second-speed clutch C2 are rotatably supported by the secondary shaft SS.

A counter second-speed gear 28, a counter third-speed gear 29, and a final drive gear 30 are fixed and mounted to the counter shaft CS. In addition, a counter idle gear 31, a counter fourth-speed gear 32, and a counter reverse gear 33 are rotatably supported by the counter shaft CS. Further, a counter first gear 34 operable to be coupled to the counter shaft CS by a first-gear hold clutch CLH is rotatably supported by the counter shaft CS.

The reverse idle gear 35 meshes with the main reverse gear 24 and the counter reverse gear 33. The counter first gear 34 is operable to be coupled to the counter thud-speed gear 29 via a one-way clutch COW. The counter fourth-speed gear 32 and the counter reverse gear 33 are operable to be selectively coupled to the counter shaft CS via a selector 36.

The main drive gear 21 meshes with the counter idle gear 31 and die counter idle gear 31 meshes with the secondary driven gear 25. The rotation of the crankshaft 1 of the engine E is transmitted to the secondary shaft SS via the torque converter 2, the main shaft MS, the main drive gear 21, the counter idle gear 31, and the secondary driven gear 25.

Accordingly, when the secondary first-speed gear 26 rotatably supported on the secondary shaft SS is coupled to the secondary shaft SS by the first-speed clutch C1, the rotation of the secondary shaft SS is transmitted to the counter shaft CS via the first-speed clutch C1, die secondary first-speed gear 26, the one-way clutch COW, and the counter third-speed gear 29 and a first-speed shift stage is thereby established. Here, the first-speed clutch C1 is held in the state of engagement as a result of establishment of second-speed to fourth-speed shift stages as well where the one-way clutch COW slips upon establishment of the second-speed to fourth-speed shift stages.

When the secondary second gear 27 rotatably supported by the secondary shaft SS is coupled to the secondary shaft SS by the second-speed clutch C2, the rotation of the secondary shaft SS is transmitted to the counter shaft CS via the second-speed clutch C2, the secondary second gear 27, and the counter second-speed gear 28 and the second-speed shift stage is thereby established.

When the main third-speed gear 22 rotatably supported by the main shaft MS is coupled to the main shaft MS via the third-speed clutch C3, the rotation of the main shaft MS is transmitted to the counter shaft CS via the third-speed clutch C3, the main third-speed gear 22, and the counter third-speed gear 29 and the third-speed shift stage is thereby established.

When the main fourth-speed gear 23 rotatably supported on the main shaft MS is coupled to die main shaft MS by the fourth-speed-reverse clutch C4R in a state where the counter fourth-speed gear 32 relatively rotatably supported to the counter shaft CS is coupled to die counter shaft CS by the selector 36, then the rotation of the main shaft MS is transmitted to the counter shaft CS via the fourth-speed-reverse clutch C4R, the main fourth-speed gear 23, the counter fourth-speed gear 32, and the selector 36 and the fourth-speed shift stage is thereby established.

When the main reverse gear 24 relatively rotatably supported to the main shaft MS is coupled to the main shaft MS by the fourth-speed-reverse clutch C4R in a state where the counter reverse gear 33 rotatably supported by the counter shaft CS is coupled to die counter shaft CS by die selector 36, then the rotation of the main shaft MS is transmitted to the counter shaft CS via the fourth-speed-reverse clutch C4R, the main reverse gear 24, the reverse idle gear 35, the counter reverse gear 33, and the selector 36 and a reverse shift stage is thereby established.

When the first-gear hold clutch CLH is brought into engagement in a state where the first-speed clutch C1 is in engagement therewith, the first-speed hold shift stage is established. When a strong engine brake is required and the first-speed hold shift stage is established, the torque of the rear wheels WRL, WRR via the first-gear hold clutch CLH can be reversely transmitted to die engine E even when the one-way clutch COW slips.

Next, the structure of the hunt differential gear 4 will be explained.

As illustrated in FIG. 2, the front differential gear 4 includes a differential case 43 rotatably supported by a transmission case 61. A final driven gear 44 meshing with the final drive gear 30 provided in the counter shaft CS is fixed on the outer periphery of the differential case 43.

The rotation of the counter shaft CS of the transmission 3 is transmitted to the differential case 43 via the final drive gear 30 and the final driven gear 44 and the rotation of the differential case 43 is transmitted to the front left axle shaft 7L and the front right axle shaft 7R in accordance with the loads of the left and right front wheels WFL, WFR.

A front left output shaft 47L continuous to the front left axle shaft 7L and a front right output shaft 47R continuous to the front right axle shaft 7R are relatively rotatably fitted to the differential case 43, and differential side gears 48,48 are spline-coupled to the opposite ends of the two output shafts 47L, 47R, respectively. A pair of pinion gears 51, 51 meshing with the two differential side gears 48,48, respectively, are rotatably supported by a pinion shaft 50 fixed to the inside of the differential case 43 such that the pinion shaft 50 is orthogonal to the two output shafts 47L, 47R.

Figure 3:
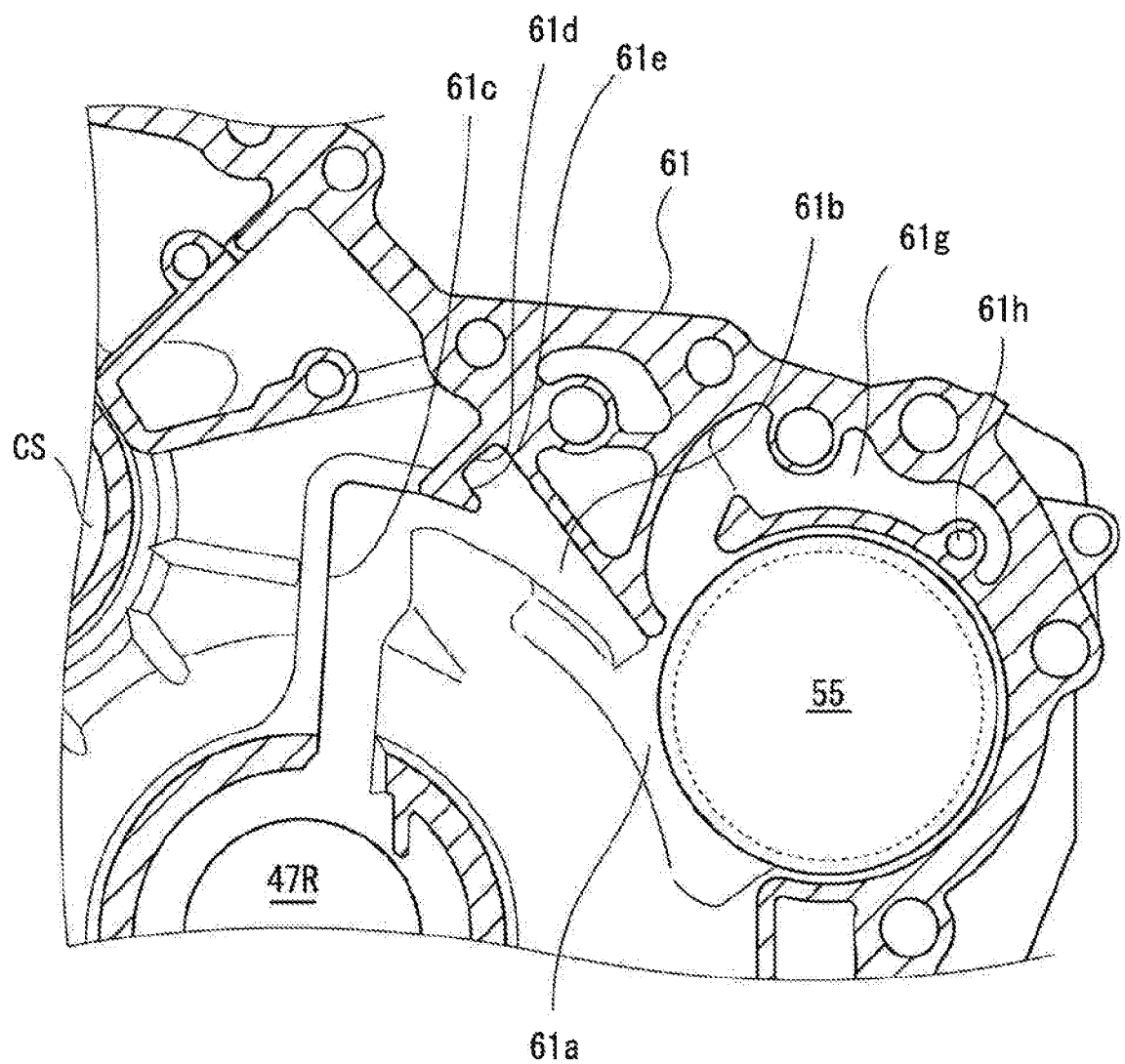
FIG. 3 is an explanatory diagram illustrating one inner side of a transmission case.
Figure 4:
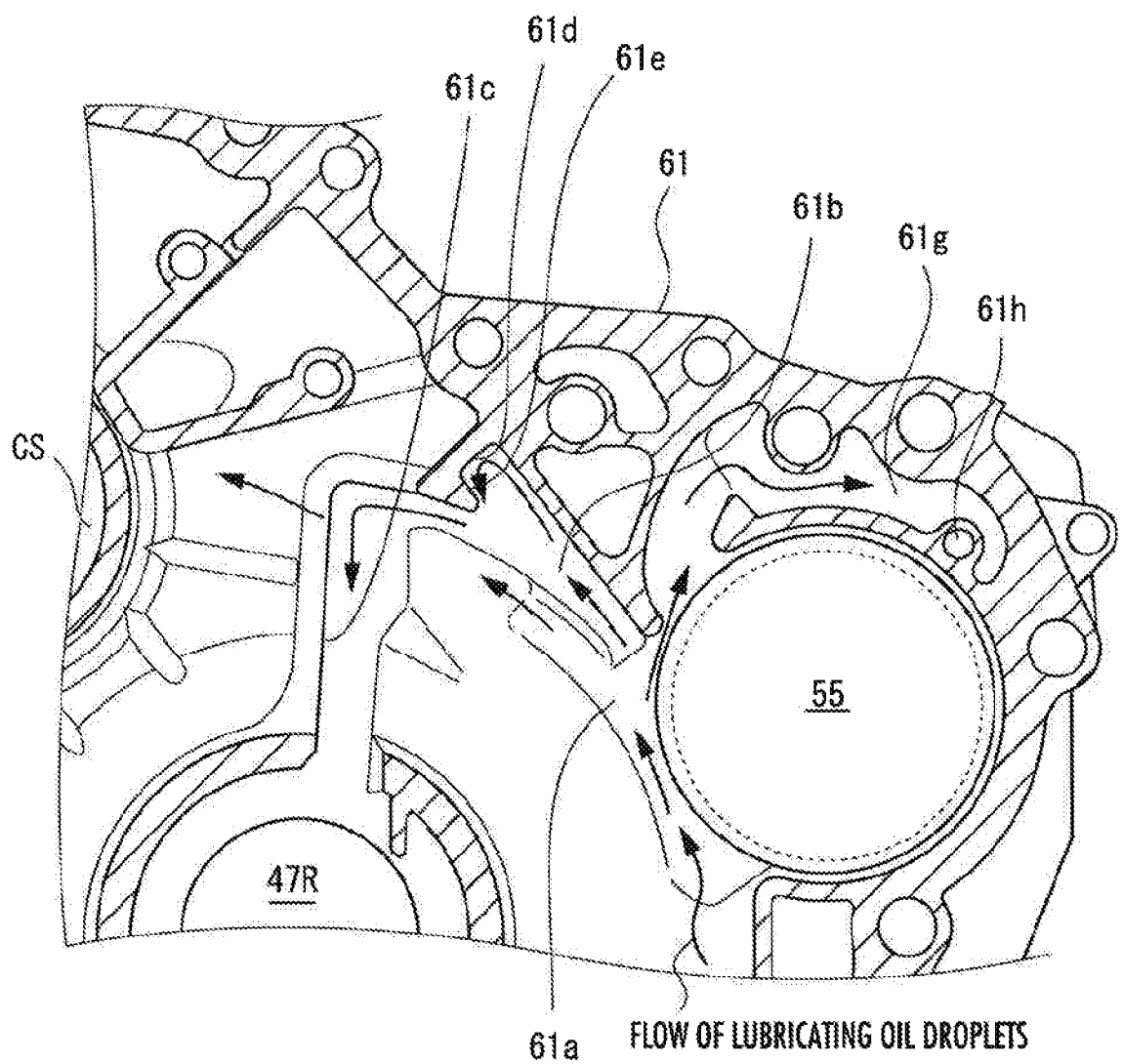
FIG. 4 is an explanatory diagram illustrating flow of lubricating oil in the one inner side of the transmission case.
Figure 5:
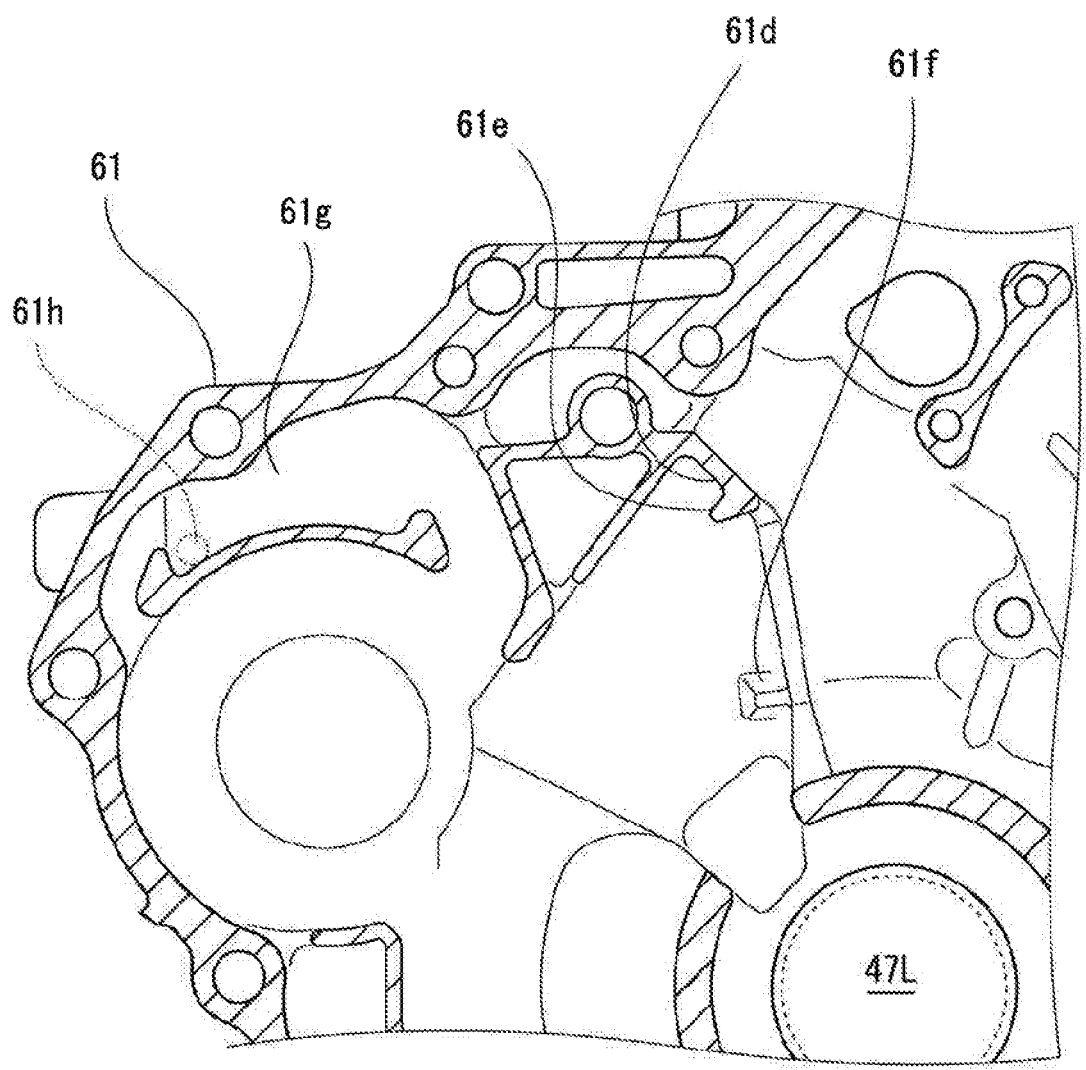
FIG. 5 is an explanatory diagram illustrating the other inner side of the transmission case.
Figure 6:
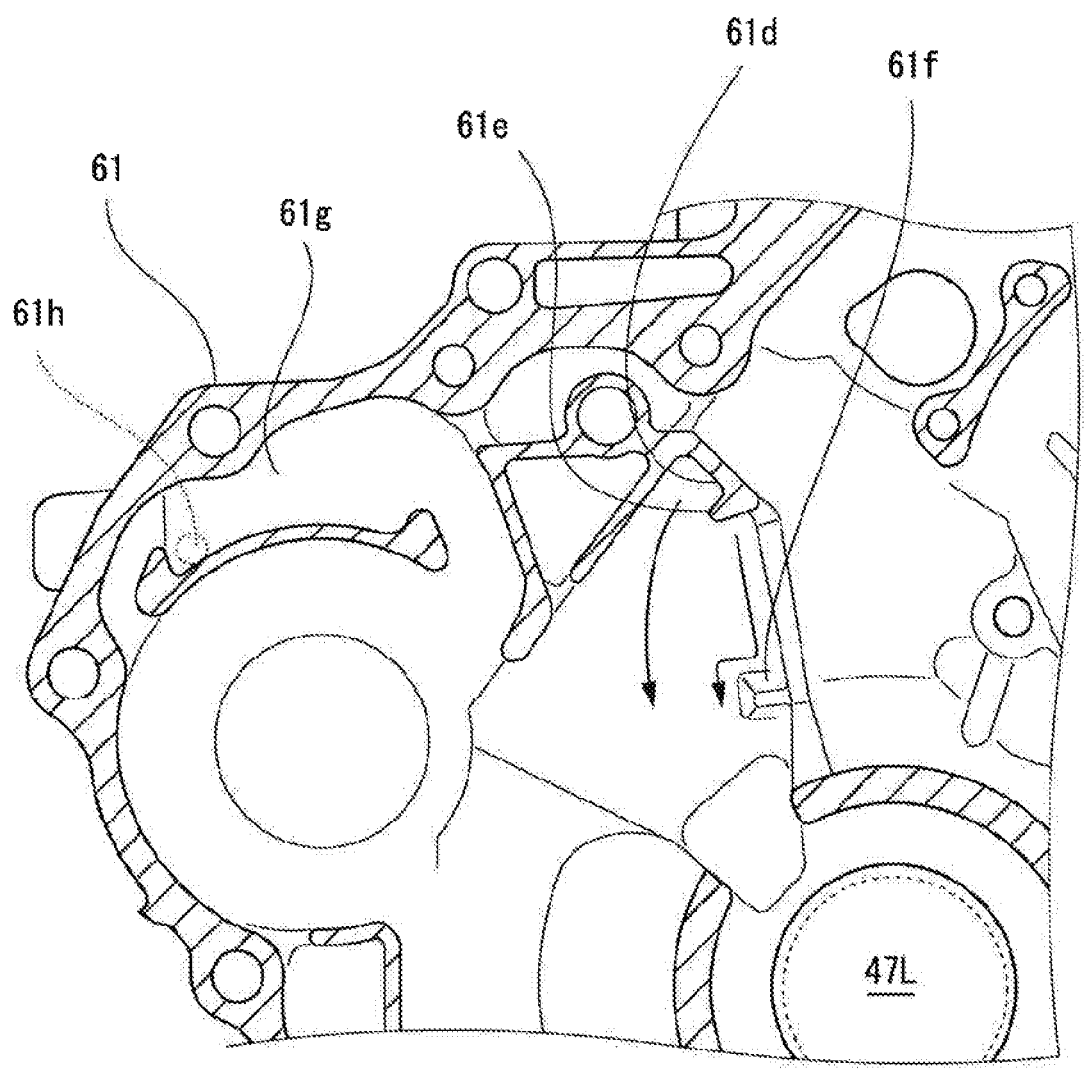
FIG. 6 is an explanatory diagram illustrating flow of lubricating oil in the other inner side of the transmission case.

Referring to FIG. 3, a transmission case 61 accommodating the front differential gear 4 according to this embodiment includes a recessed section 61a that is recessed with a semi-circular cross section toward the transfer device 5, in a direction corresponding to the axis of the center of rotation about which the final driven gear 44 is rotated, such that the recessed section 61a corresponds to the portion where the final driven gear 44 meshes with a transfer input gear 56 constituted by a helical gear.

By virtue of the recessed section 61a, the lubricating oil is scooped up by the final driven gear 44 the lower end of which is immersed in the reservoir of lubricating oil (fluid) accumulated at the bottom of the transmission case 61, and part of the lubricating oil scooped and splashed passes through the recessed section 61a is without being interfered by a portion where the final driven gear 44 and the transfer input gear 56 constituted by a helical gear mesh with each other, making it possible to guide the scooped lubricating oil until it readies the portion where the final driven gear 44 and the final drive gear 30 mesh with each other.

Also, the transmission case 61 includes a bearing lubrication groove 61b as a guiding groove for guiding the lubricating oil droplets extending upward from the bottom portion of the recess that is recessed with a semi-circular cross section toward the space higher than one bearing 43a (on the right side in FIGS. 1 and 2) of the two bearings 43a, 43b pivotally supporting the differential case 43. By virtue of the bearing lubrication groove 61b, part of the lubricating oil droplets entering the recessed section 61a passes through the bearing lubrication groove 61b, hits a sidewall 61c provided so as to be positioned above the bearing 43a of the transfer device 5 (the one side, which is the right side in FIGS. 1 and 2) and drops to be guided to the bearing 43a.

Figure 7:
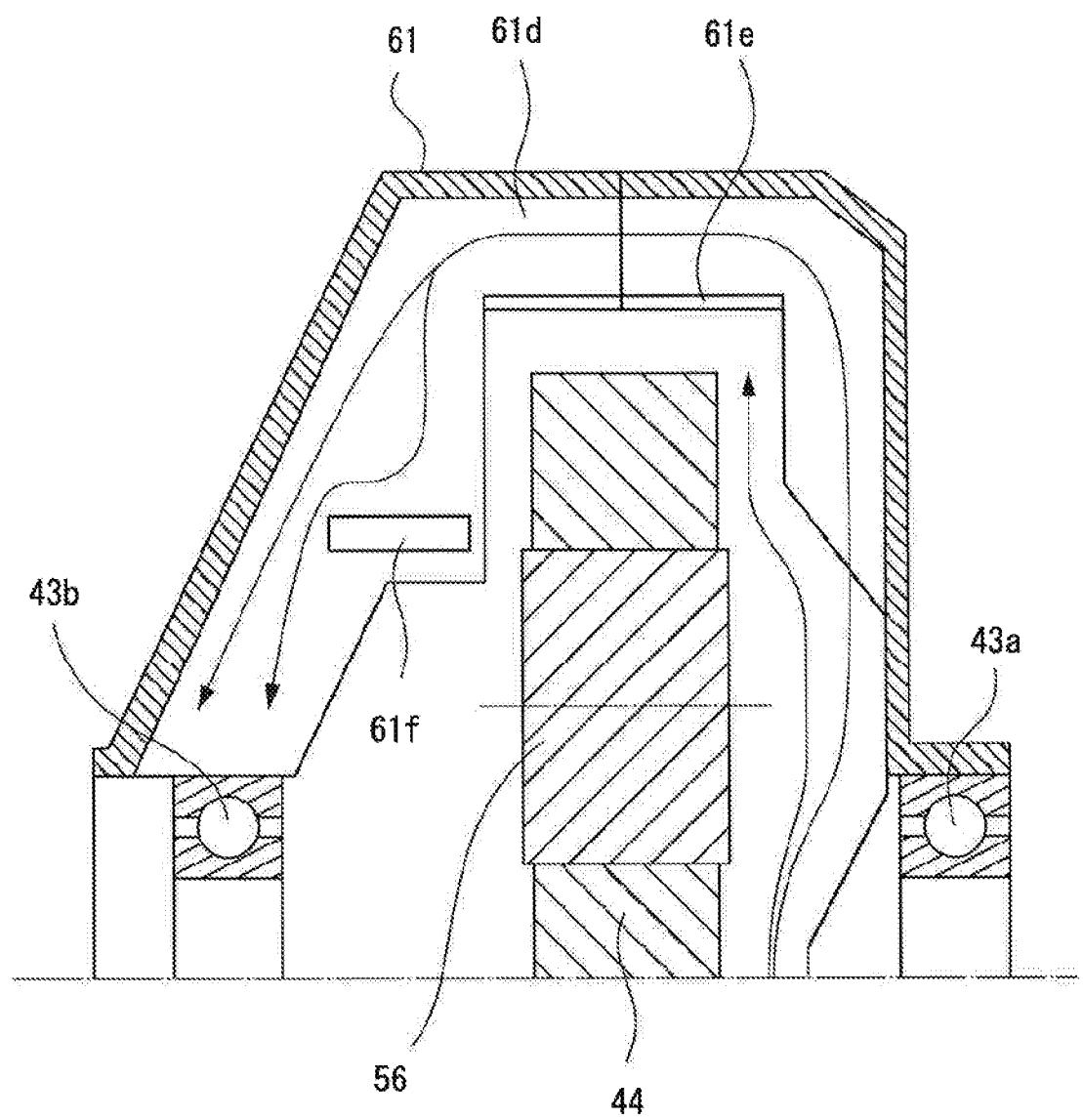
FIG. 7 is an explanatory diagram illustrating flow of lubricating oil inside the transmission case.

Also, a delivery rib 61d extending downward and in a direction corresponding to the rotational axis about which the final driven gear 44 rotates is provided on the inner wall surface, which is positioned above the front differential gear 4, of the transmission case 61. Part of the lubricating oil droplets passing through the bearing lubrication groove 61b hits the delivery rib 61d. The delivery rib 61d extends until it reaches a space higher than the bearing 43b on die opposite side (the other side, which is the left side in FIGS. 1 and 2). A claw section 61e is provided at the lower end of the delivery rib 61d such that the claw section 61e is bent in a folded shape toward the recessed section 61a. By virtue of the claw section 61e the lubricating oil attached to the delivery rib 61d is prevented from easily dropping and, as illustrated in FIG. 7, the lubricating oil is allowed to be more readily guided to the bearing 43b on the opposite side (the other side). In addition, by the lubricating oil dropping via the delivery rib 61d, the bearing 43b on the opposite side (the other side) is lubricated.

The transmission case 61 includes a guide projection 61f. The guide projection 61f is provided below the end on the opposite side (the other side) of the delivery rib 61d. The guide projection 61f is configured to receive the lubricating oil that has dropped and guide it to the bearing 43b on the opposite side (the other side) such that the lubricating oil that has moved by the delivery rib 61d to the opposite side (the other side) is appropriately guided to the bearing 43b on the opposite side (the other side). By virtue of the guide projection 61f, the lubricating oil that has been guided via the delivery rib 61d can be appropriately guided to the bearing 43b on die opposite side (the other side) by the guide projection 61f.

Also, part of the lubricating oil droplets that entered the recessed section 61a is accumulated in an oil reservoir 61g provided above the transfer input gear 56 constituted by a helical gear of die transfer input shaft 55, and the lubricating oil is guided from a through hole 61h as the guide section to the transfer device 5.

Next, the structure of the transfer device 5 according to this embodiment will be explained.

Figure 8:
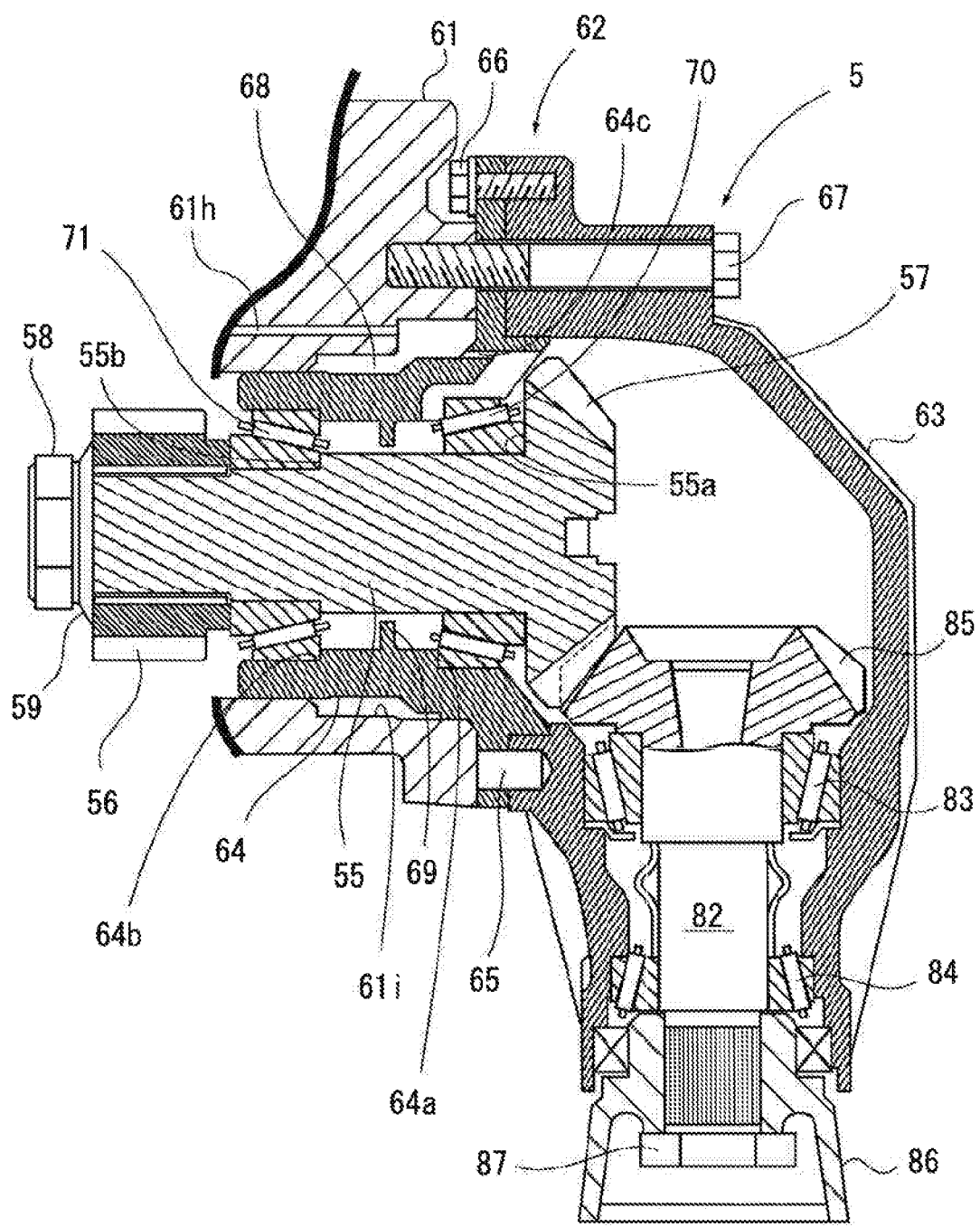
FIG. 8 is a perspective view illustrating a transfer device.

The rotation of die final driven gear 44 is transmitted, as illustrated in FIG. 8, to the second bevel gear 85 of die transfer output shaft 82 via the transfer input gear 56 constituted by a helical gear of die transfer input shaft 55 and the first bevel gear 57. The transfer input gear 56 meshes with the final driven gear above die center of rotation of the final driven gear 44. By virtue of this, a space is allowed to be provided below the transfer device 5, which makes it possible to improve the degree of freedom of layout of vehicle components. The rotation is transmitted by the transfer output shaft 82 to the propeller shaft 8 (see FIG. 1).

The transfer case 62 is fixed to the right side surface of the transmission case 61 (specifically, a torque converter case constituting pan of the transmission case). The transfer case 62 is constituted by a transfer case main body 63 and a transfer cover 64.

The transfer case main body 63 and die transfer cover 64 are constructed by fastening them into one unit using multiple bolts 66 in a state where they are held in position by a knock pin 65. The transfer case 62 placed in the form of a subassembly is fastened to the transmission case 61 using multiple bolls 67 extending through the transfer case main body 63 and the transfer cover 64.

The transfer cover 64 is fitted into a support hole 61i (concave section) of the transmission case 61. The transfer case 62 is fixed to the transmission case 61 by the bolt 67 in die state where the transfer cover 64 is fitted into die support hole 61*i*.

The transfer input gear 56 is spline-fitted to the left end of the transfer input shaft 55 extending in the left-right direction defined with reference to the vehicle body and fixed using a nut 58 between the washer 59 and an inner race of the tapered roller bearing 71. The transfer input shaft 55 includes in one piece therewith a first bevel gear 57 at its right end.

The transfer input shaft 55 is supported by a pair of tapered roller bearings 70,71 provided on an inner peripheral surface of the transfer cover 64. The inner race of die tapered roller bearing 70 on the right side is brought into locking engagement with a step section 55*a* (back surface of the first bevel gear 57) of the boundary between the transfer input shaft 55 and die first bevel gear 57.

An outer race of the tapered roller bearing 70 on the right side is brought into locking engagement with a step section 64*a* of the transfer cover 64. The inner race of the tapered roller bearing 71 on the left side is brought into locking engagement between the transfer input gear 56 (helical gear) and a step section 55*b* of the transfer input shaft 55. The outer race of the tapered roller bearing 71 on the left side is brought into locking engagement by a step section 64*b* of the transfer cover 64.

The leftward thrust force of the transfer input shaft 55 tram the first bevel gear 57 is received via the tapered roller bearing 70 by the step section 64*a* of the transfer cover 64. The rightward thrust force of the transfer input shaft 55 is received via the transfer input gear 56 and the tapered roller bearing 71 by the step section 64*b* of the transfer cover 64. The precompression of the pair of tapered roller bearings 70,71 can be adjusted by the degree of fastening of the nut 58 and by attaching a shim to the step section 55*b* of the transfer input shaft 55.

In transfer case main body 63, a transfer output shaft 82 which extends in the front-near direction is supported by a pair of tapered roller bearings 83,84 and a second bevel gear 85 provided at its front end meshes with the first bevel gear 57. A joint 86 to which the front end of the propeller shaft 8 is coupled is spline-coupled to the rear end of the transfer output shaft 82 and fixed using a nut 87.

Figure 9:
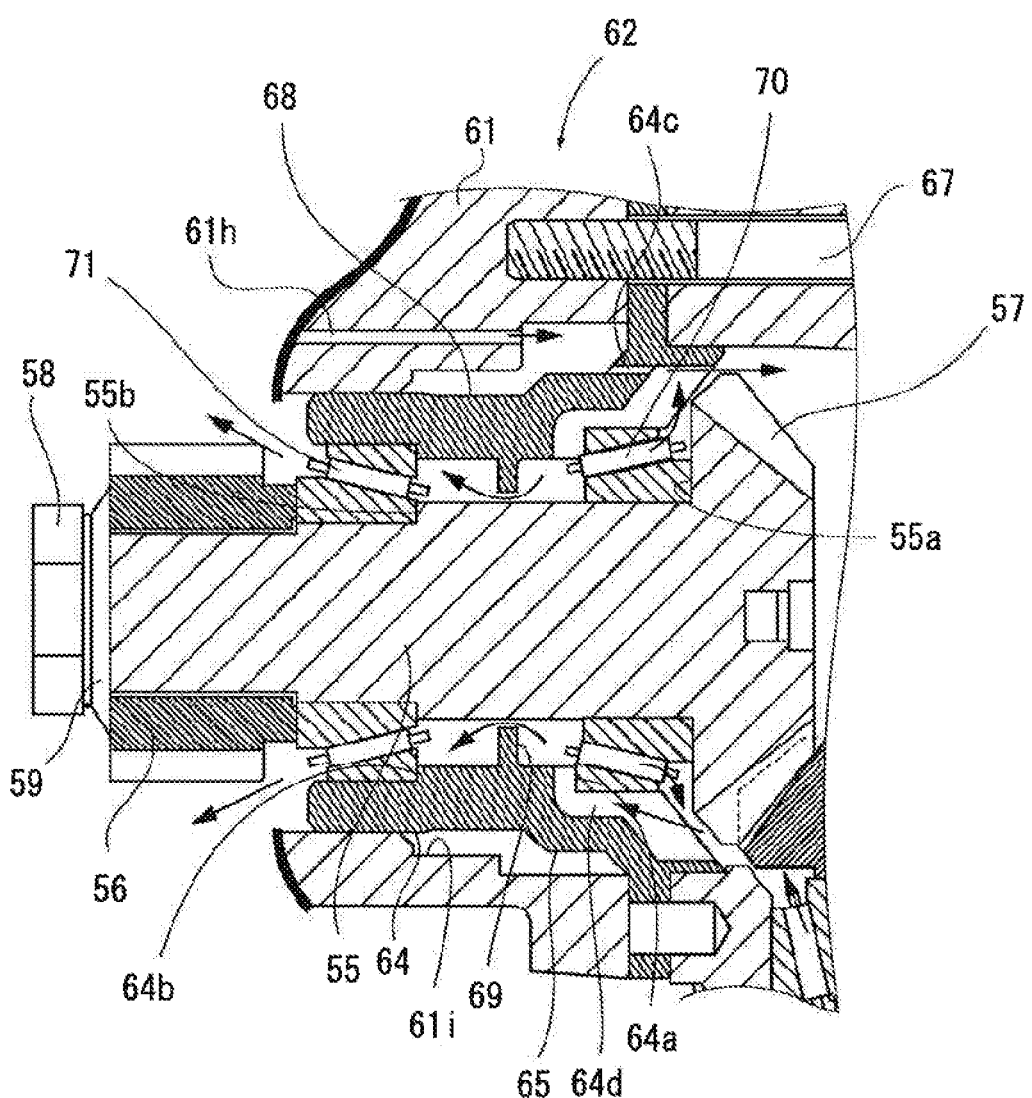
FIG. 9 is an explanatory diagram illustrating a transfer input shaft of the transfer device.
Figure 10:
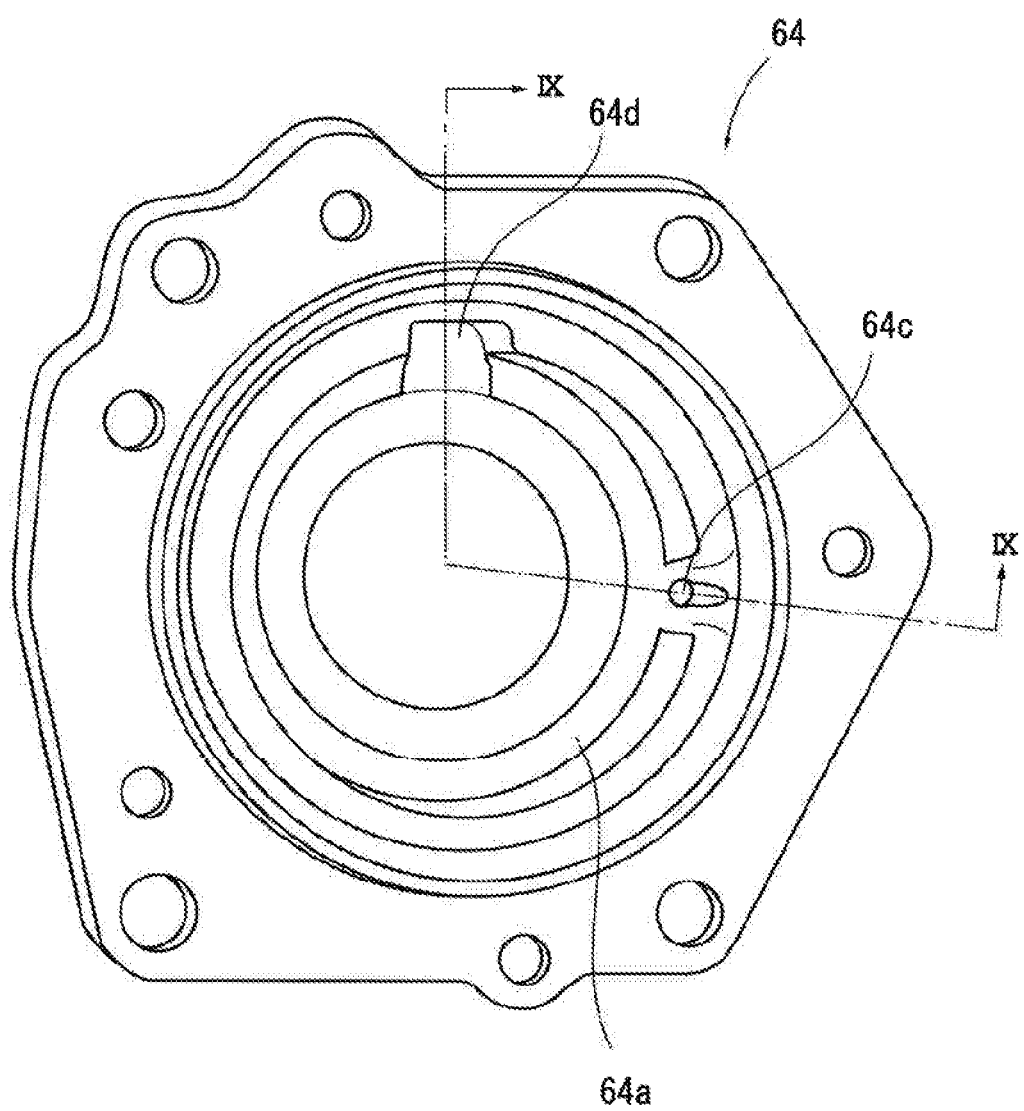
FIG. 10 is an explanatory diagram illustrating transfer cover from one side.

As illustrated in FIG. 9, the lubricating oil that has flowed from the transmission case 61 through the through hole 61*h* as a guide section is temporarily stored in an annular groove 68 which is an inner peripheral surface of the support hole 61*i* of the transmission case 61 and provided on an outer peripheral surface of the transfer cover 64. As illustrated in FIG. 10 in die direction corresponding to the central axis about which the transfer input shaft 55 rotates, a communication hole 64*c* that allows an annular groove 68 provided on an outer peripheral surface of the transfer cover 64 and an inner peripheral surface of the transfer cover 64 to communicate each other is formed on the right side of the transfer cover 64 in FIG. 10. Also, a notch 64*d* is provided on the inner peripheral surface of the transfer cover 64 such that the lubricating oil can bypass the outer surface of the tapered roller bearing 70 so as to guide the lubricating oil into the space between the tapered roller bearings 70,71.

Figure 11:
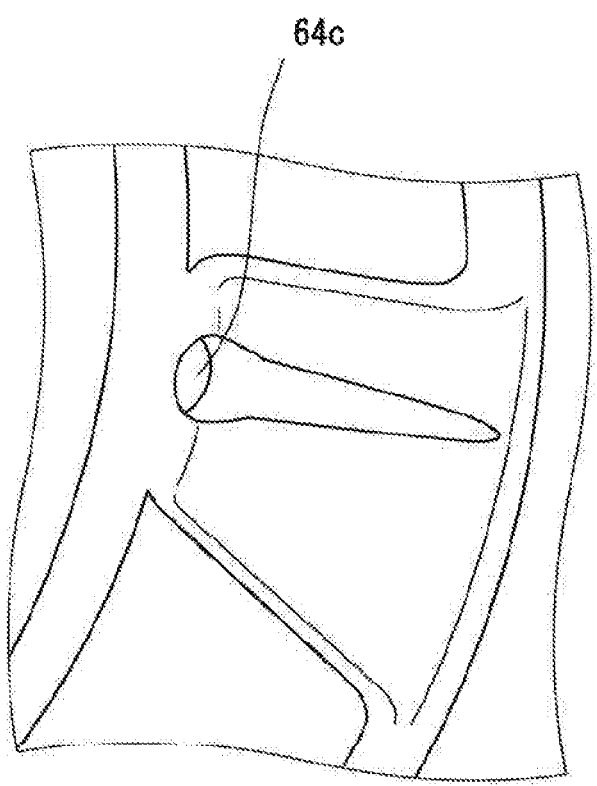
FIG. 11 is a perspective view illustrating part of the transfer cover as an enlarged view.
Figure 12:
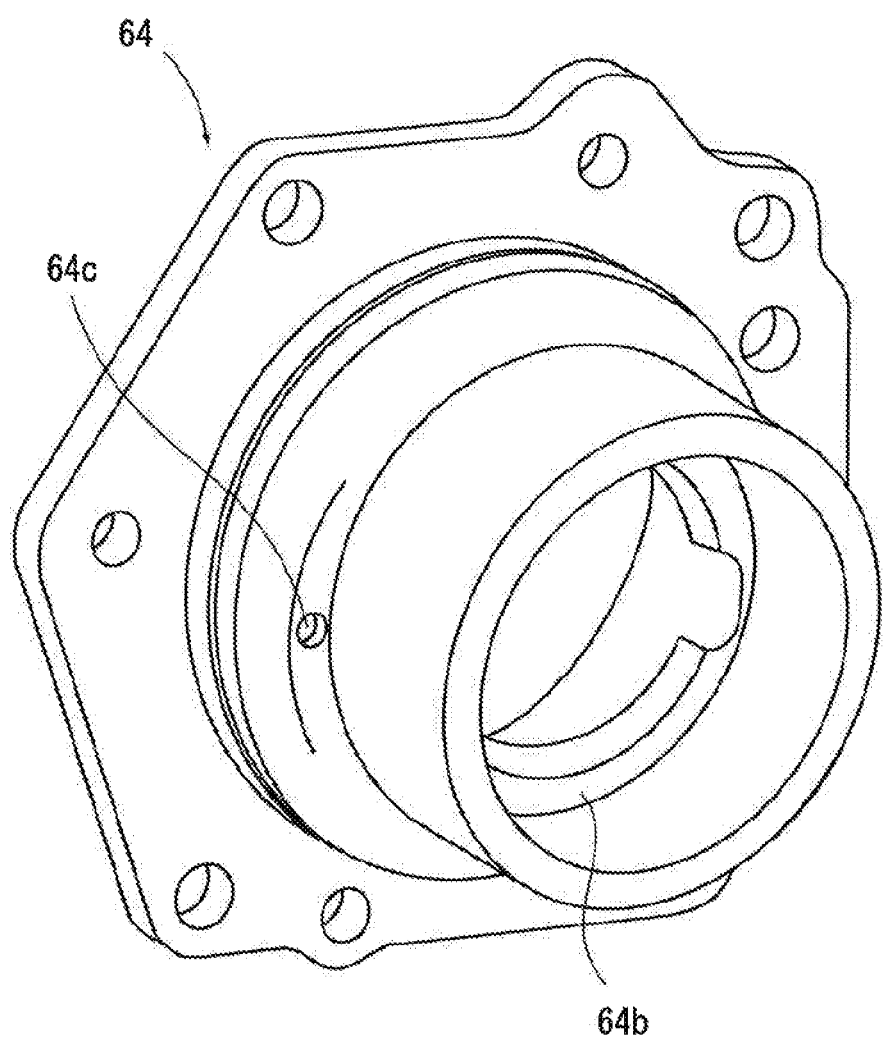
FIG. 12 is an explanatory diagram illustrating the transfer cover from the other side.

The dash-dotted line in FIG. 10 indicates the cut cross section of FIG. 9. FIG. 11 illustrates the communication hole 64*c* in an enlarged view. FIG. 12 is a perspective view that illustrates the transfer cover 64 from the opposite side of FIG. 11. The lubricating oil stored in the annular groove 68 is supplied via the communication hole 64*c* to the inside of the transfer device 5.

Also, as illustrated in FIG. 9, an annular weir section 69 extending inwardly in a radial direction is provided on the inner peripheral surface of the transfer cover 64 so as to inhibit flow of the lubricating oil back to the front differential gear 4. By virtue of the weir section 69, leakage of the lubricating oil (fluid) is prevented from the inside of the transfer device 5 into the transmission case 61 and die amount of the lubricating oil in the transfer device 5 can be appropriately maintained.

Figure 13:
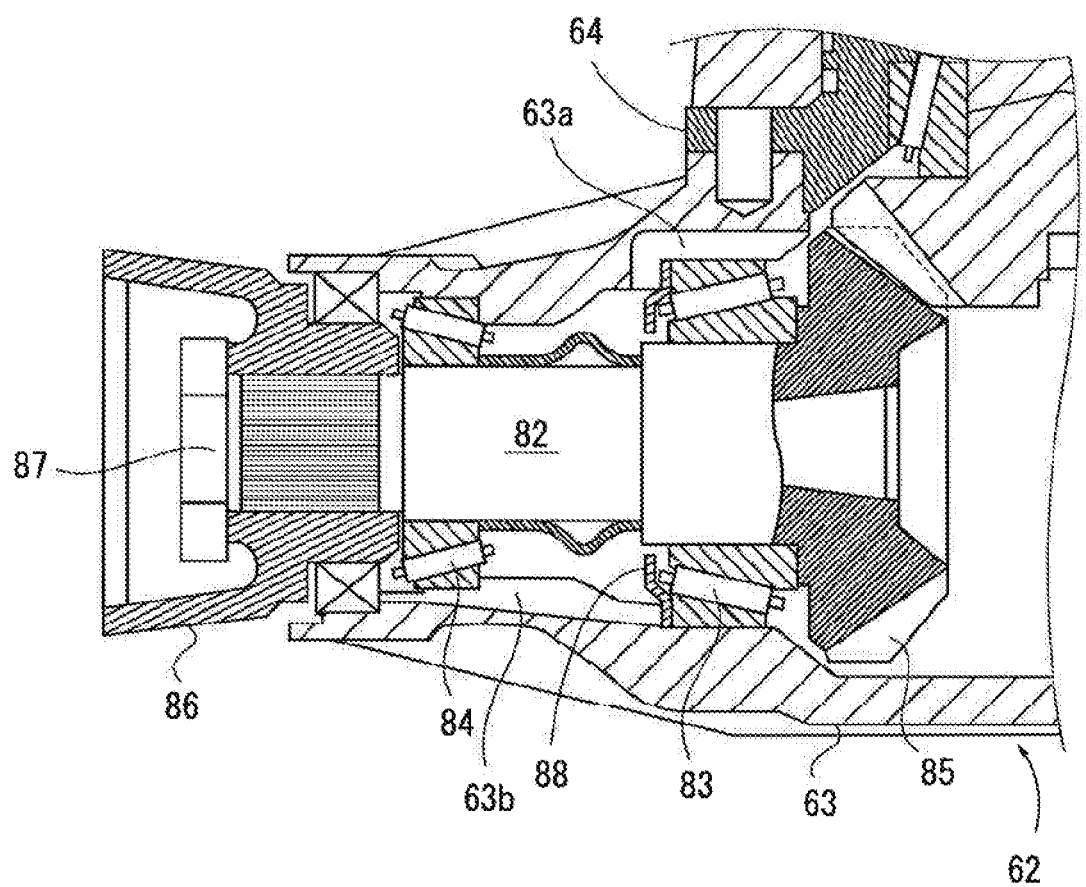
FIG. 13 is an explanatory diagram illustrating a transfer output shaft of the transfer device.
Figure 14:
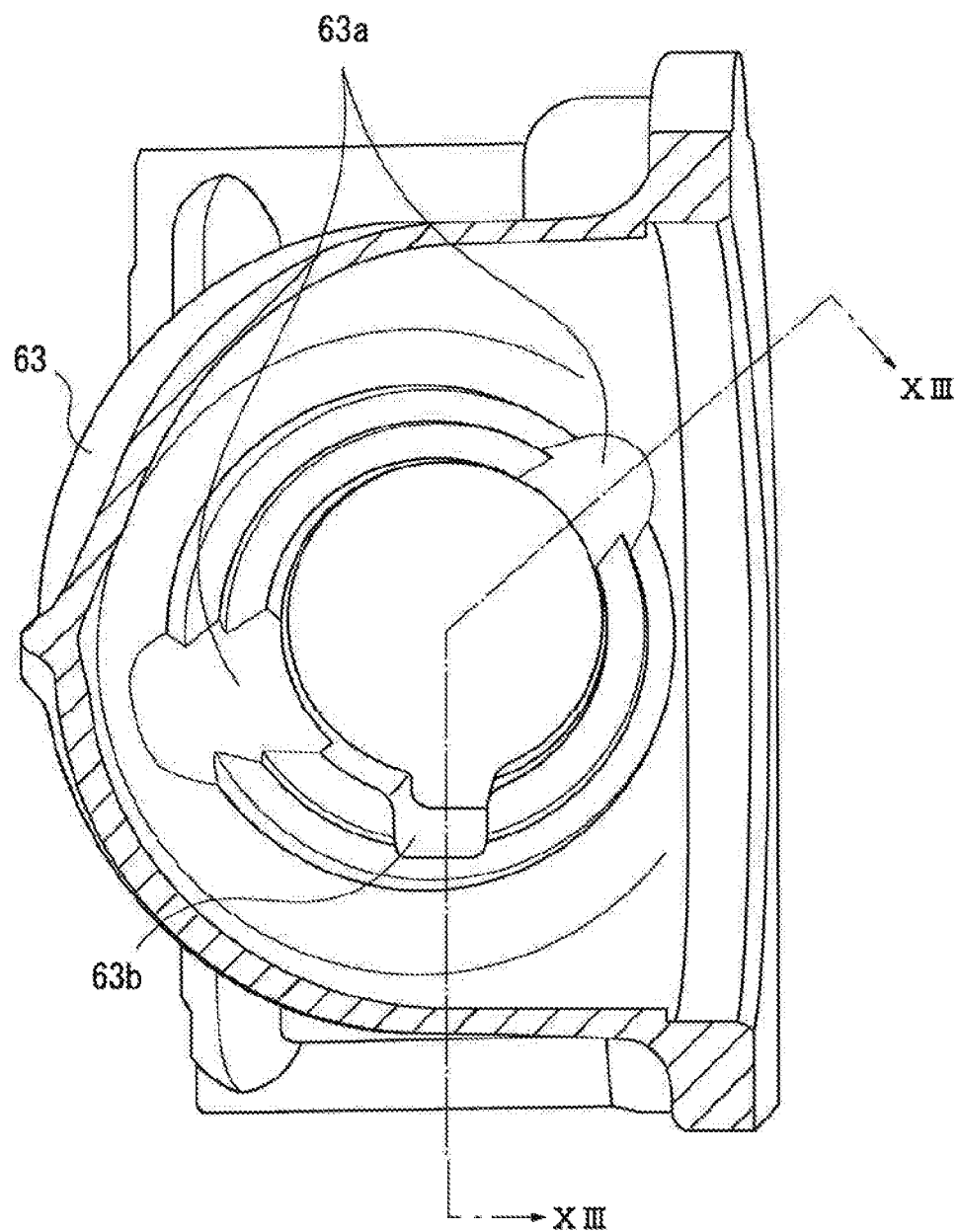
FIG. 14 is an explanatory diagram illustrating a portion of the transfer case in which the transfer output shaft is inserted wife part of it cut away.

FIG. 13 is an explanatory diagram that illustrates part of the transfer output shaft 82 by its cross section. FIG. 14 is an explanatory diagram that illustrates the portion of the transfer case main body 63 accommodating the transfer output shaft 82 from the front side of the vehicle in the direction corresponding to the central axis about which the transfer output shaft 82 rotates. The dash-dotted line of FIG. 14 indicates the cut cross section of FIG. 13.

As illustrated in FIGS. 13 and 14, a notch 63*a* for guiding part of the lubricating oil scooped up by the first and second bevel gears 57,85 is provided between two tapered roller bearings 83,84 supporting the transfer output shaft 82 in the transfer case main body 63. By virtue of the notch 63*a*, die two tapered roller bearings 83,84 pivotally supporting the transfer output shaft 82 can be appropriately lubricated.

The transfer case main body 63 includes a return groove 63*b* such that the lubricating oil that has been discharged rearward, from the tapered roller bearing 84 on the rear side of the vehicle in the direction corresponding to the central axis about which the transfer output shaft 82 rotates, out of the two tapered roller bearings 83,84 supporting the transfer output shaft 82, is allowed to flow back to the space between the tapered roller bearings 83,84.

Also, a suppression plate 88 inhibiting discharge out of the tapered roller bearing 84 is provided on the tapered roller bearing 83 on the front side of the vehicle in the direction corresponding to the central axis about which the transfer output shaft 82 rotates, out of the two tapered roller bearings 83,84 supporting the transfer output shaft 82, such that the amount of the lubricating oil between the tapered roller bearings 83,84 can be appropriately maintained. By virtue of this, the amount of the lubricating oil between the tapered roller bearings 83,84 can be maintained in an appropriate level and the tapered roller bearing 83,84 can be sufficiently lubricated.

According to this embodiment, the lubricating cal scooped up by the final driven gear 44 via the through hole 61*h* as the guide section can be guided into the transfer case 62, so that the transfer device 5 can be lubricated using the lubricating oil scooped up by the final driven gear 44. Accordingly, in comparison with a case where a dedicated lubricating oil for the transfer device is separately used, it is made possible to simplify the configuration of the transfer device 5 and simplify the fluid circulation channel of the power transmission device including the transfer device 5 and the final driven gear 44.

While the embodiment has been explained, the present invention is not limited to the illustrated one and design changes may be made thereto as appropriate.

Also, while this embodiment has been explained as the one in which the transfer input gear 56 is in direct meshing engagement with the final driven gear 44, the transfer input gear of the present invention does not need to be in direct meshing engagement with the final driven gear. For example, the transfer input gear may be configured to be brought into meshing engagement with the final driven gear or any other gear provided in the differential case so as to rotate integrally with the final driven gear.

When the transfer input gear is to be brought into meshing engagement with another gear, the recessed section should be provided in the transmission case so as to correspond to the portion where the transfer input gear meshes with the other gear such that it is recessed toward the transfer device in the direction corresponding to the central axis about which the final driven gear rotates.

REFERENCE SIGNS LIST

3: transmission
4: front differential gear
43: differential case
43a, 43b: bearing
5: transfer device
55: transfer input shaft
56: transfer input gear (helical gear)
57: first bevel gear
61: transmission case
61a: recessed section
61b: bearing lubrication groove
61c: sidewall
61d: delivery rib
61e: claw section
61f: guide projection
61g: oil reservoir
61h: through hole (guide section)
61i: support hole
62: transfer case
63: transfer case main body
63a notch
63b: return groove
64: transfer cover
64a, 64b: step section
64c: communication hole
64d: notch
68: annular groove
69: weir section
70,71: tapered roller bearing
82: transfer output shaft
83,84: tapered roller bearing
85: second bevel gear
88: suppression plate
E: engine
PT: power transmission device
WFL, WFR: left and right front wheels
WRL WRR: left and right rear wheels

The invention claimed is:

1. A power transmission device comprising a transfer device, the transfer device including:
   a transfer input gear meshing with a final driven gear or another gear rotating integrally with the final driven gear;
   a transfer input shaft pivotally supporting the transfer input gear;
   a first bevel gear provided on the transfer input shaft;
   a second bevel gear meshing with the first bevel gear;
   a transfer output shaft pivotally supporting the second bevel gear;
   a transfer case covering at least the first bevel gear and the second bevel gear; and
   a guide section guiding at least part of scooped fluid that is scooped up by the final driven gear into the transfer case, wherein
   the transfer input gear meshes with the final driven gear or the another gear above a rotation center of the final driven gear,
   a direction of rotation of the transfer input gear or the another gear and the final driven gear is a direction in which a portion of meshing engagement with each other rotates upward,
   a transmission case is included that is configured to accommodate the final driven gear or the another gear and the transfer input gear,
   the scooped fluid is part of lubricating oil accumulated at a bottom of the transmission case wherein a lower end of the final driven gear is immersed in the lubricating oil,
   the final driven gear meshing with a final drive gear; and
   the transmission case rotatably supporting the final driven gear via a bearing, wherein
   the transmission case includes a recessed section that is recessed toward the transfer device in a direction corresponding to a central axis about which the final driven gear rotates, the recessed section corresponding to a portion where the final driven gear or another gear rotating integrally with the final driven gear meshes with the transfer input gear, and
   the guide section is positioned on a front side in a direction of rotation of the final driven gear or the another gear or the transfer input gear relative to a portion where the final driven gear or the another gear and the transfer input gear mesh with each other.

2. The power transmission device according to claim 1, comprising a pair of tapered roller bearings pivotally supporting the transfer input shaft in the transfer case, wherein
   the pair of the tapered roller bearings are arranged such that directions in which the tapered roller bearings taper face each other, and
   a weir section is provided on an inner peripheral surface of the transfer case so as to suppress the fluid flowing out of the transfer case into final driven gear side, the weir section being positioned between the pair of the tapered roller bearings.

3. The power transmission device according to claim 1, wherein a plurality of bearings are provided in the transfer case, the bearings pivotally supporting the transfer output shaft, and
   a suppression plate is provided, the suppression plate suppressing leakage of the fluid between the bearings toward the second bevel gear such that the fluid between the bearings is retained.

4. The power transmission device according to claim 1, wherein a plurality of bearings are provided in the transfer case, the bearings pivotally supporting the transfer output shaft, and
   an intake port for the fluid is provided, the intake port guiding at least part of the fluid scooped up by the first bevel gear and/or the second bevel gear into a space between the bearings of the transfer output shaft.

5. The power transmission device according to claim 1, comprising:
   the final driven gear meshing with a final drive gear; and
   the transmission case rotatably supporting the final driven gear via a bearing, wherein
   the transmission case includes a bearing lubrication guide section positioned above the bearing, the bearing lubrication guide section being configured to receive fluid scooped up by the final driven gear and guide the fluid to the bearing.

6. The power transmission device according to claim 5, wherein the transmission case includes a recessed section that is recessed toward the transfer device in a direction corresponding to a central axis about which the final driven gear rotates, the recessed section corresponding to a portion where the final driven gear or another gear rotating integrally with the final driven gear meshes with the transfer input gear, and the guide section is positioned on a front side in a direction of rotation of the final driven gear or the another gear or the transfer input gear relative to a portion where the final driven gear or the another gear and the transfer input gear mesh with each other.

7. The power transmission device according to claim 6, wherein the transmission case includes a bearing lubrication groove extending from the recessed section toward the bearing lubrication guide section.

8. The power transmission device according to claim 1, comprising:

the final driven gear meshing with a final drive gear; and
the transmission case rotatably supporting the final driven gear via a bearing, the power transmission device comprising:
a receiving section receiving scooped fluid that is scooped up by the final driven gear above one side in a direction corresponding to a central axis about which the final driven gear rotates; and
a bridge section guiding the received fluid to an other side in the direction corresponding to the central axis about which the final driven gear rotates, wherein
the fluid is guided to the bearing positioned on the other side in the direction corresponding to the central axis about which the final driven gear rotates.

9. The power transmission device according to claim 8, comprising an other-side guide section configured to guide the fluid guided to the other side via the bridge section to the bearing.

10. The power transmission device according to claim 8, wherein the one side is the transfer device side.

11. The power transmission device according to claim 10, wherein the transmission case includes a recessed section that is recessed toward the transfer device in a direction corresponding to the central axis about which the final driven gear rotates, the recessed section corresponding to a portion where the final driven gear or another gear rotating integrally with the final driven gear meshes with the transfer input gear, and
the guide section is positioned on a front side in a direction of rotation of the final driven gear or the another gear or the transfer input gear relative to a portion where the final driven gear or the another gear and the transfer input gear mesh with each other.

12. The power transmission device according to claim 8, wherein a claw section bent so as to inhibit dropping of the fluid is provided at a lower end of the bridge section.

13. The power transmission device according to claim 1, wherein the guide section is positioned at a front side of a flow of the oil generated by gear rotation than the portion of meshing engagement.

14. A power transmission device comprising:
a final driven gear meshing with a final drive gear;
a transmission case rotatably supporting the final driven gear via a bearing; and
a transfer device, the transfer device including
a transfer input gear meshing with the final driven gear or another gear rotating integrally with the final driven gear;
a transfer input shaft pivotally supporting the transfer input gear;
a first bevel gear pivotally supported by the transfer input shaft;
a second bevel gear meshing with the first bevel gear; and
a transfer output shaft pivotally supporting the second bevel gear, wherein
the transmission case includes a recessed section that is recessed toward the transfer device in a direction corresponding to a central axis about which the final driven gear rotates, the recessed section corresponding to a portion where the final driven gear or the another gear meshes with the transfer input gear,
the transfer input gear meshes with the final driven gear above a rotation center of the final driven gear,
a direction of rotation of the transfer input gear and the final driven gear is a direction in which a portion of meshing engagement with each other rotates upward,
the transmission case is configured to accommodate the final driven gear or the another gear and the transfer input gear,
the scooped fluid is part of lubricating oil accumulated at a bottom of the transmission case wherein a lower end of the final driven gear is immersed in the lubricating oil,
the final driven gear meshing with a final drive gear; and
the transmission case rotatably supporting the final driven gear via a bearing, wherein
the transmission case includes a recessed section that is recessed toward the transfer device in a direction corresponding to a central axis about which the final driven gear rotates, the recessed section corresponding to a portion where the final driven gear or another gear rotating integrally with the final driven gear meshes with the transfer input gear, and
the guide section is positioned on a front side in a direction of rotation of the final driven gear or the another gear or the transfer input gear relative to a portion where the final driven gear or the another gear and the transfer input gear mesh with each other.

15. A power transmission device comprising:
a final driven gear meshing with a final drive gear; and
a transmission case rotatably supporting the final driven gear via a bearing, the power transmission device comprising:
a receiving section receiving scooped fluid that is scooped up by the final driven gear above one side in a direction corresponding to a central axis about which the final driven gear rotates;
a bridge section guiding the received fluid to an other side in the direction corresponding to the central axis about which the final driven gear rotates; and
a transfer device, the transfer device including:
a transfer input gear meshing with the final driven gear or another gear rotating integrally with the final driven gear;
a transfer input shaft pivotally supporting the transfer input gear;
a first bevel gear pivotally supported by the transfer input shaft;
a second bevel gear meshing with the first bevel gear; and
a transfer output shaft pivotally supporting the second bevel gear, wherein
the bridge section is configured to guide the fluid to the bearing positioned on the other side in the direction corresponding to the central axis about which the final driven gear rotates, the transfer input gear meshes with the final driven gear above a rotation center of the final driven gear,
a direction of rotation of the transfer input gear and the final driven gear is a direction in which a portion of meshing engagement with each other rotates upward,
the transmission case is configured to accommodate the final driven gear or the another gear and the transfer input gear, and
the scooped fluid is part of lubricating oil accumulated at a bottom of the transmission case wherein a lower end of the final driven gear is immersed in the lubricating oil.

\* \* \* \* \*